United States Patent
Freudelsperger (10) Patent No.: US 7,344,348 B2
(45) Date of Patent: Mar. 18, 2008

(54) STORAGE AND RETRIEVAL UNIT AND METHOD FOR CONTROLLING PRODUCT STORAGE SHELVING, ESPECIALLY A COMMISSION DEVICE

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 493 days.

(21) Appl. No.: 10/480,972

(22) PCT Filed: Jun. 18, 2002

(86) PCT No.: PCT/EP02/06707

§ 371 (c)(1),
(2), (4) Date: Dec. 11, 2003

(87) PCT Pub. No.: WO03/002432

PCT Pub. Date: Jan. 9, 2003

(65) Prior Publication Data

US 2005/0074315 A1    Apr. 7, 2005

(30) Foreign Application Priority Data

Jun. 27, 2001    (DE) ................................ 101 30 984

(51) Int. Cl.
*B65G 1/04*    (2006.01)

(52) U.S. Cl. .................... 414/278; 414/280; 198/836.2

(58) Field of Classification Search ................ 414/278, 414/276, 280; 198/599, 600, 353, 382, 836.2, 198/836.3
See application file for complete search history.

(56) References Cited

U.S. PATENT DOCUMENTS 3,275,135 A * 9/1966 Niese .......................... 209/595

(Continued)

FOREIGN PATENT DOCUMENTS

DE    42 35 576    4/1994

(Continued)

*Primary Examiner*—James Keenan
(74) *Attorney, Agent, or Firm*—McGlew and Tuttle, P.C.

(57) ABSTRACT

A storage and retrieval unit (1) is provided for operating a product storage shelving (2), which has at least one shelf, on which essentially cubic products (4, 5, 6) are arranged and held. The products can be removed and fed to a driven, essentially horizontal continuous belt (8) of a height-adjustable storage and retrieval unit that is movable along the product storage shelving. The products removed are centered by a centering device with a lateral product centering element (9), which is arranged on a transverse side of the continuous belt (8) in the area of at least one longitudinal end of the continuous belt. The lateral product centering element centers a product removed from the product storage shelving (2) against a lateral longitudinal stop (10) of the continuous belt (8). Differently configured cubic products may be handled by the storage and retrieval unit in an easy, fast and reliable manner.

24 Claims, 12 Drawing Sheets

U.S. PATENT DOCUMENTS

| | | | | |
|---|---|---|---|---|
| 3,455,469 | A | * | 7/1969 | Evans .................. 414/280 |
| 3,523,618 | A | * | 8/1970 | Nielson ................ 198/349.8 |
| 3,674,159 | A | * | 7/1972 | Lemelson ............. 414/276 |
| 3,750,804 | A | * | 8/1973 | Lemelson ............. 414/276 |
| 3,805,974 | A | * | 4/1974 | Andersson et al. .... 414/276 |
| 3,883,008 | A | * | 5/1975 | Castaldi ............... 414/270 |
| 4,389,157 | A | * | 6/1983 | Bernard et al. ........ 414/787 |
| 4,754,867 | A | * | 7/1988 | De Anda .............. 198/464.2 |
| 4,828,102 | A | * | 5/1989 | Dotson et al. ......... 198/588 |
| 4,915,209 | A | * | 4/1990 | Canziani .............. 198/357 |
| 5,149,240 | A | * | 9/1992 | Di Rosa ............... 414/277 |
| 5,203,661 | A | * | 4/1993 | Tanita et al. ........... 414/331.16 |
| 5,394,979 | A | * | 3/1995 | Hall et al. ............. 198/836.3 |
| 5,520,276 | A | * | 5/1996 | Aoki et al. ............ 198/345.1 |
| 5,655,870 | A | * | 8/1997 | Yasuhara et al. ...... 414/273 |
| 5,791,852 | A | * | 8/1998 | Bibby et al. ........... 414/278 |
| 5,860,504 | A | * | 1/1999 | Lazzarotti ............. 198/357 |
| 5,882,166 | A | * | 3/1999 | Fuke et al. ............ 414/331.12 |
| 5,921,377 | A | | 7/1999 | Tan et al. |
| 6,042,321 | A | * | 3/2000 | Labell .................. 414/276 |
| 6,142,376 | A | * | 11/2000 | Cherry et al. ......... 235/462.14 |
| 6,158,566 | A | * | 12/2000 | Pollock ................ 198/347.3 |
| 6,357,985 | B1 | * | 3/2002 | Anzani et al. ......... 414/331.05 |
| 6,378,695 | B1 | * | 4/2002 | Rinne ................... 198/836.3 |
| 2006/0099055 | A1 | * | 5/2006 | Stefani ................. 414/277 |

FOREIGN PATENT DOCUMENTS

| | | | |
|---|---|---|---|
| EP | 0 866 002 | | 9/1998 |
| JP | 5-97220 | * | 4/1993 ............ 198/836.3 |
| JP | 6-40556 | * | 2/1994 ............ 198/836.3 |

* cited by examiner

STORAGE AND RETRIEVAL UNIT AND METHOD FOR CONTROLLING PRODUCT STORAGE SHELVING, ESPECIALLY A COMMISSION DEVICE

FIELD OF THE INVENTION

The present invention pertains to a storage and retrieval unit and a method for operating a product storage shelving, which has at least one shelf, on which essentially cubic products are arranged and held, and from which said products can be removed and fed to a driven, essentially horizontal continuous belt of the height-adjustable storage and retrieval unit which can be displaced along the product storage shelving, wherein the products removed are centered by a centering device.

BACKGROUND OF THE INVENTION

A storage and retrieval unit of the above-mentioned type is known from, e.g., EP 0 866 002 A2; this storage and retrieval unit can be used to remove products to be commissioned from the product storage shelving, but also to introduce products into the product storage shelving, doing so by means of two continuous belts, with an operating finger each being provided on the longitudinal end sides. To remove products from an oblique storage shelving, the storage and retrieval unit is placed with its operating finger under the lowermost frontmost product of the storage shelving. The storage and retrieval unit is then lifted, so that the operating finger or the frontmost end of the continuous belt is lifted as well, it extends below the frontmost lowermost product from the product storage shelving, lifts the product via a stopper and thus places same on the continuous belt of the storage and retrieval unit. Products remaining in the storage shelving push the frontmost product out of the shelf during the product removal because of their own weight. The products delivered onto the continuous belt are centered by the centering device in the form of adjustable lateral product guides, which are provided on each side of the continuous belt in the form of two bent guide rails. The two guide rails are adjusted laterally and vertically simultaneously in relation to the transverse direction of the continuous belt. The drawback is that only identically configured products or individual goods can be guided or centered by the two guide rails.

SUMMARY OF THE INVENTION

The object of the present invention is to design a storage and retrieval unit of the type described in the introduction such that differently configured cubic products can also be handled in a simple, reliable and fast manner.

The object of the present invention is, furthermore, to provide a simple and reliable method for removing products from a product storage shelving by means of a storage and retrieval unit of the type described in the introduction.

According to the invention, a storage and retrieval unit is provided for operating a product storage shelving, which has at least one shelf, on which essentially cubic products are arranged and held and from which such products can be removed and fed to a driven, essentially horizontal continuous belt of the height-adjustable storage and retrieval unit that is movable along the product storage shelving. The products removed are centered by a centering device. The centering device comprises a lateral product centering element, preferably a centering plate, which is arranged on a transverse side of the continuous belt in the area of at least one longitudinal end of the continuous belt. The lateral centering plate or the lateral centering plates is/are set to the width of the product or corresponding to the width of the product. The effect of the lateral displacement of the products is generated by the displacement of the continuous belt and of an extension belt section that may be optionally arranged upstream. The continuous belt is connected with the centering plate on the side of the lateral longitudinal stop. As a result, the products are centered after the removal from the product storage unit, preferably by operating fingers, in the lateral product centering element set to the product width, and are as a result always oriented on one side to the continuous belt and stored on same. The product will then be in contact with the lateral longitudinal stop. The lateral product centering element may have conical stop faces in the form of vertical guide plates, which facilitate the passage of the product without the possibility of jamming.

According to another aspect of the invention, a method is provided for removing products from a product storage shelving by means of the storage and retrieval unit. The product storage shelving has at least one oblique shelf, on which essentially cubic products are arranged one after another and are held against a shelf stop at the deepest point of the said oblique shelf. An operating finger of the height-adjustable storage and retrieval unit, which said storage and retrieval unit is movable along the said product storage shelving, can extend under the lowermost product of the products arranged one after another at the said shelf stop, lift same over the shelf stop and transfer same. The transfer is in a centered manner after centering by a centering device to a horizontal, driven continuous belt of the storage and retrieval unit. The continuous belt is guided via end-side defecting rollers. A product removed from the product storage shelving by means of the operating finger is laterally centered against the lateral longitudinal stop by moving the driven continuous belt including an extension belt section optionally arranged upstream after setting a lateral product centering element, preferably a centering plate, to the product width in the transverse direction of the said continuous belt in the direction of the longitudinal stop.

The longitudinal stop is longer than the longitudinal extension of the continuous belt and preferably has above-mentioned extension belt sections on both longitudinal sides of the storage and retrieval unit. By placing or laterally displacing the products removed from the product storage shelving up to the longitudinal stop, the cubic products are positioned along the longitudinal stop at an angle to the continuous belt regardless of their dimensioning and are consequently laterally centered.

The term "cubic products" also comprises nearly cubic products, e.g., even bottles of a nearly cubic shape with a correspondingly short bottle neck, e.g., cubic plastic bottles for pharmaceutical preparations.

Consequently, contrary to the above-mentioned state of the art, cubic products of different size (large and small cubes, large and small and especially also slim parallelepipeds) of a product storage shelving, especially of a commissioning device, can also be handled simultaneously by means of the storage and retrieval unit.

The lateral product centering element, of which one lateral product centering element each is preferably provided at each longitudinal end of the continuous belt, i.e., two lateral product centering elements, which are rigidly connected to one another, is driven by a centering drive, which is actuated by a central control unit, which also actuates the drive of the continuous belt. The path of displacement or setting path of the lateral product centering element corresponds to the width of a product to be handled and is set correspondingly by the central control unit. It is obvious that the product is not pressed by applying a force to the longitudinal stop, but is placed only "loosely" in the angle between the longitudinal stop and the upper strand of the continuous belt. If products of different dimensions are present on a continuous belt placed in such a way, especially at closely spaced locations one after another, these products are arranged in a sufficiently stable manner in such a way that a transverse displacement or transverse shifting of the storage and retrieval unit is also possible along a product storage shelving at least in one direction with great acceleration/deceleration from one location of the storage unit to the other, namely, in the direction in which the products being laterally accelerated/decelerated are pressed to the longitudinal stop.

The products can be stored and conveyed not only at closely spaced locations from one another, but, as an alternative, also with spaces of any desired configuration between the products.

Another aspect of the present invention is that in an advantageous variant of the present invention, the continuous belt including the longitudinal stop can be tilted in the transverse direction of the continuous belt into a pivoted position in which the root of the angle between the longitudinal stop and the continuous belt is located at the deepest point. As a result, products of different dimensions present on the continuous belt are stabilized in such a way that a transverse acceleration/transverse deceleration of the continuous belt is possible in both directions, and the products are held in their centering angle in a sufficiently stable manner.

A storage and retrieval unit designed in such a manner can be handled especially rapidly with a high commissioning output even at large, long product storage shelvings. The tilted position of the continuous belt including the longitudinal stop is set only during a transverse movement of the storage and retrieval unit. If the storage and retrieval unit is in a removal position aligned with a product storage shelving or in a discharge position in relation to a downstream joining conveyor belt, the tilted position of the continuous belt including the longitudinal stop is not set: The continuous belt is located—when viewed in the transverse direction of the continuous belt—in a horizontal position, which is also shared by the shelves of the product storage shelving or the joining conveyor belt.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Referring to the drawings in particular, the storage and retrieval unit 1 is part of a commissioning device for cubic products to be commissioned or buffered. The storage and retrieval unit 1 can be positioned via a central control unit at the product storage shelving 2 at the desired location of a product to be removed, and the removal of the product can also be controlled via the central control unit. The central control unit also controls the individual drives of the storage and retrieval unit 1, which will be described below.

The product storage shelving 2 has oblique shelves, which are arranged at closely spaced locations next to each other, forming storage planes, and at closely spaced locations one on top of another, forming a plurality of storage planes. The product storage shelving 2 is schematically shown in the left-hand part of FIG. 4A.

Figures 8A, 8B:
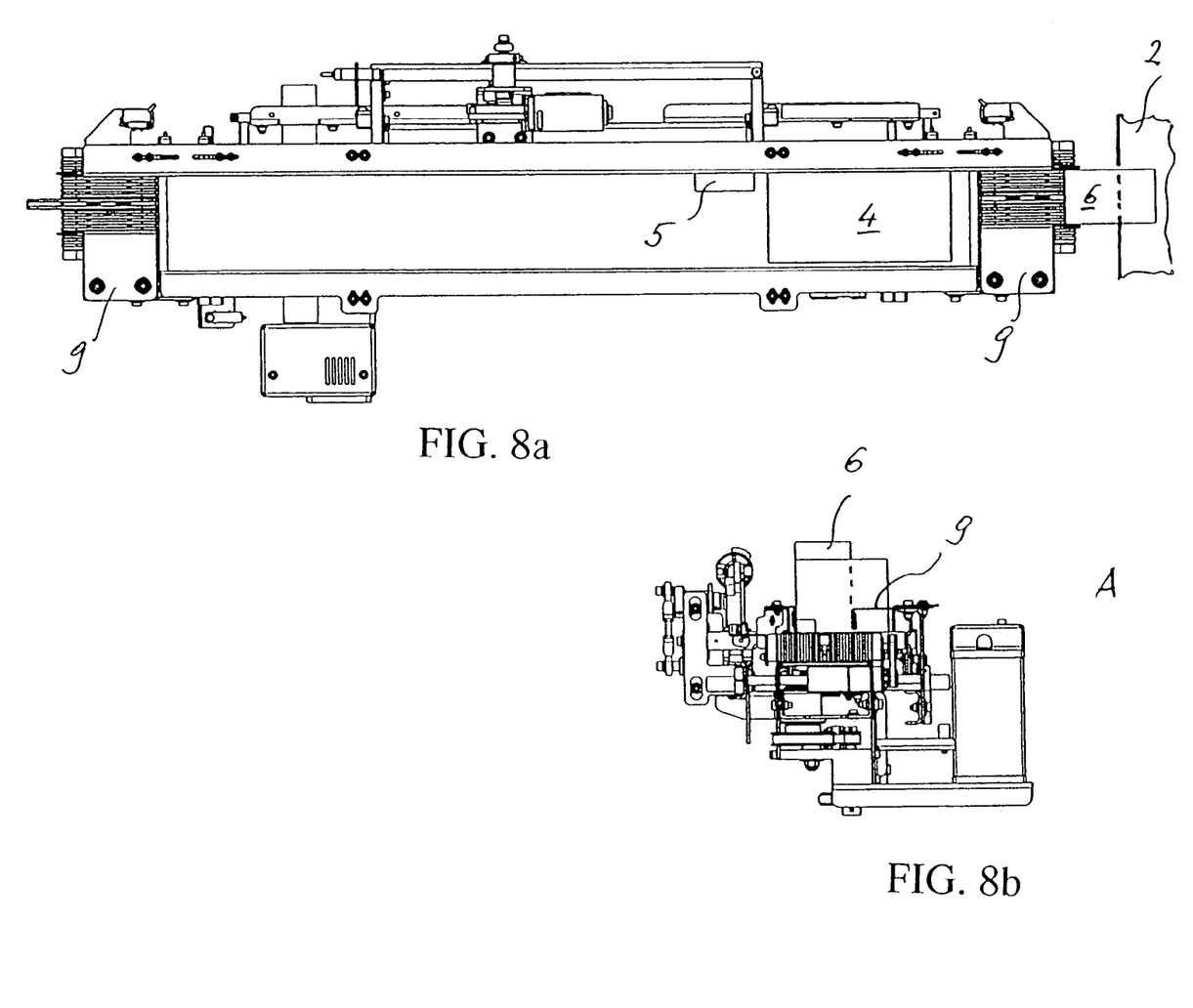
FIG. 8A is a top view of the product handling unit according to FIG. 3 in another handling position of the storage and retrieval unit.
FIG. 8B is a front view of the product handling unit according to FIG. 3 in another handling position of the storage and retrieval unit.

Another product storage shelving 2 is located on the other side of the storage and retrieval unit 1 according to the right-hand part of FIG. 8A.

The two product storage shelvings 2 form an automatic aisle, in which the storage and retrieval unit 1 can be displaced longitudinally or can travel longitudinally, so that it can be positioned at individual selected shelves of the product storage shelving 2.

Figures 4A, 4B:
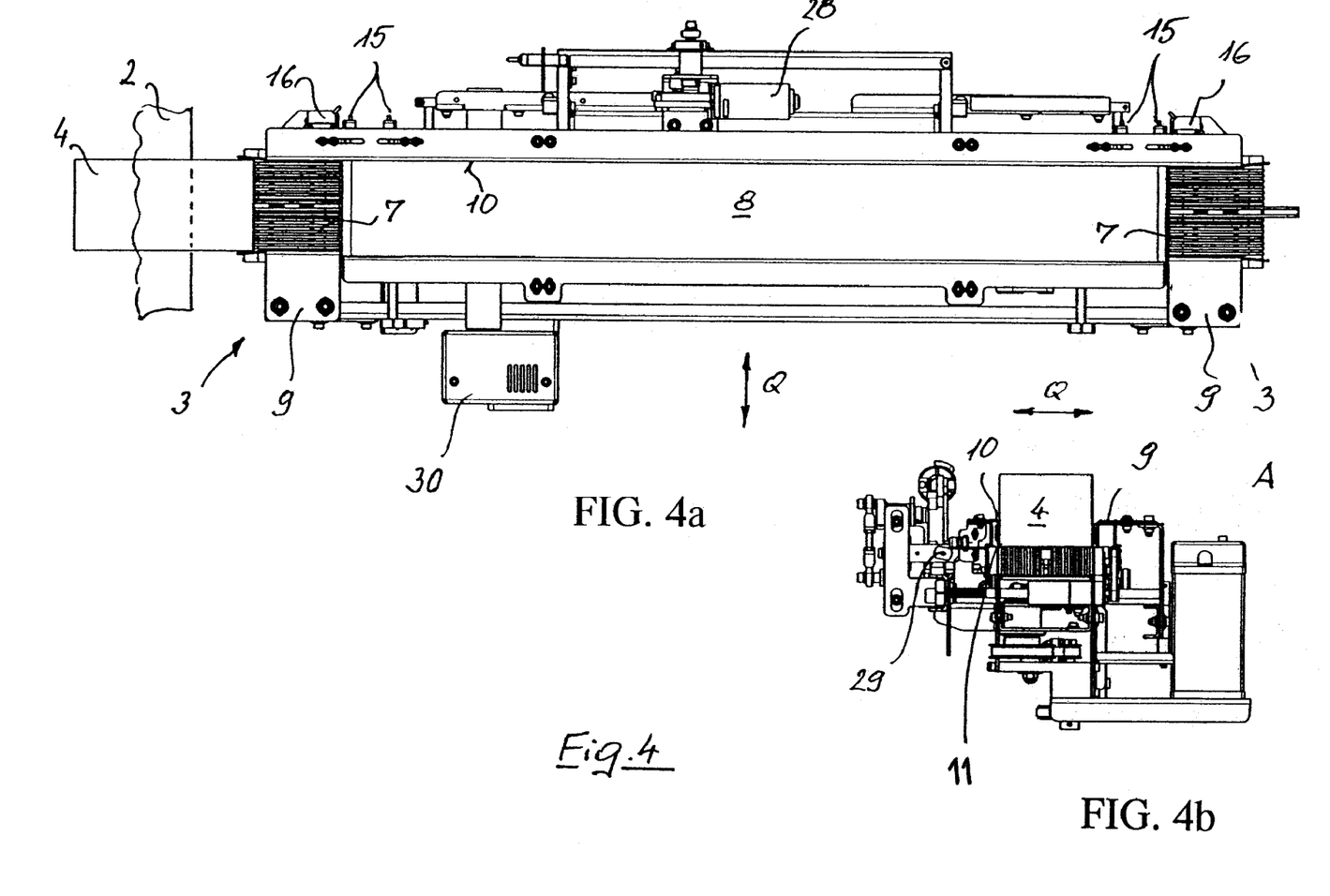
FIG. 4A is a top view of the product handling unit according to FIG. 3 in a handling position of the storage and retrieval unit.
FIG. 4B is a front view of the product handling unit according to FIG. 3 in a handling position of the storage and retrieval unit.

The storage and retrieval unit 1 has an essentially symmetrical design in relation to its longitudinal extension in order to make it possible to operate both product storage shelvings 2 according to FIGS. 4A and 8A, which are located at spaced locations from each other, by means of end-side operating fingers 7.

The operating fingers 7 are driven circulating belts which are short in their longitudinal extension with a central, narrow circulating belt, which is longer than the rest of the driven circulating belts and forms the farthest projecting extension of the storage and retrieval unit on the longitudinal end side.

Figure 1:
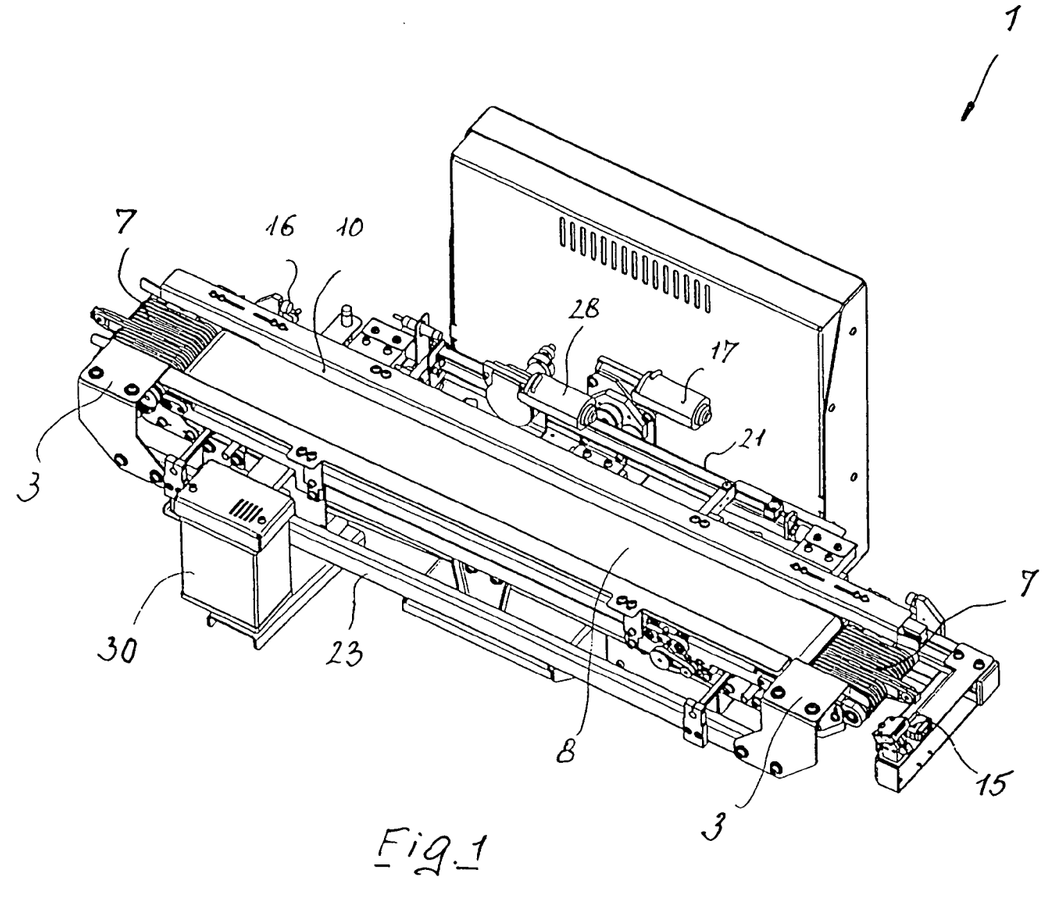
FIG. 1 is a perspective view of a storage and retrieval unit according to the present invention without a lower displacing or pushing mechanism for displacing or pushing along a product storage shelving.
Figure 2:
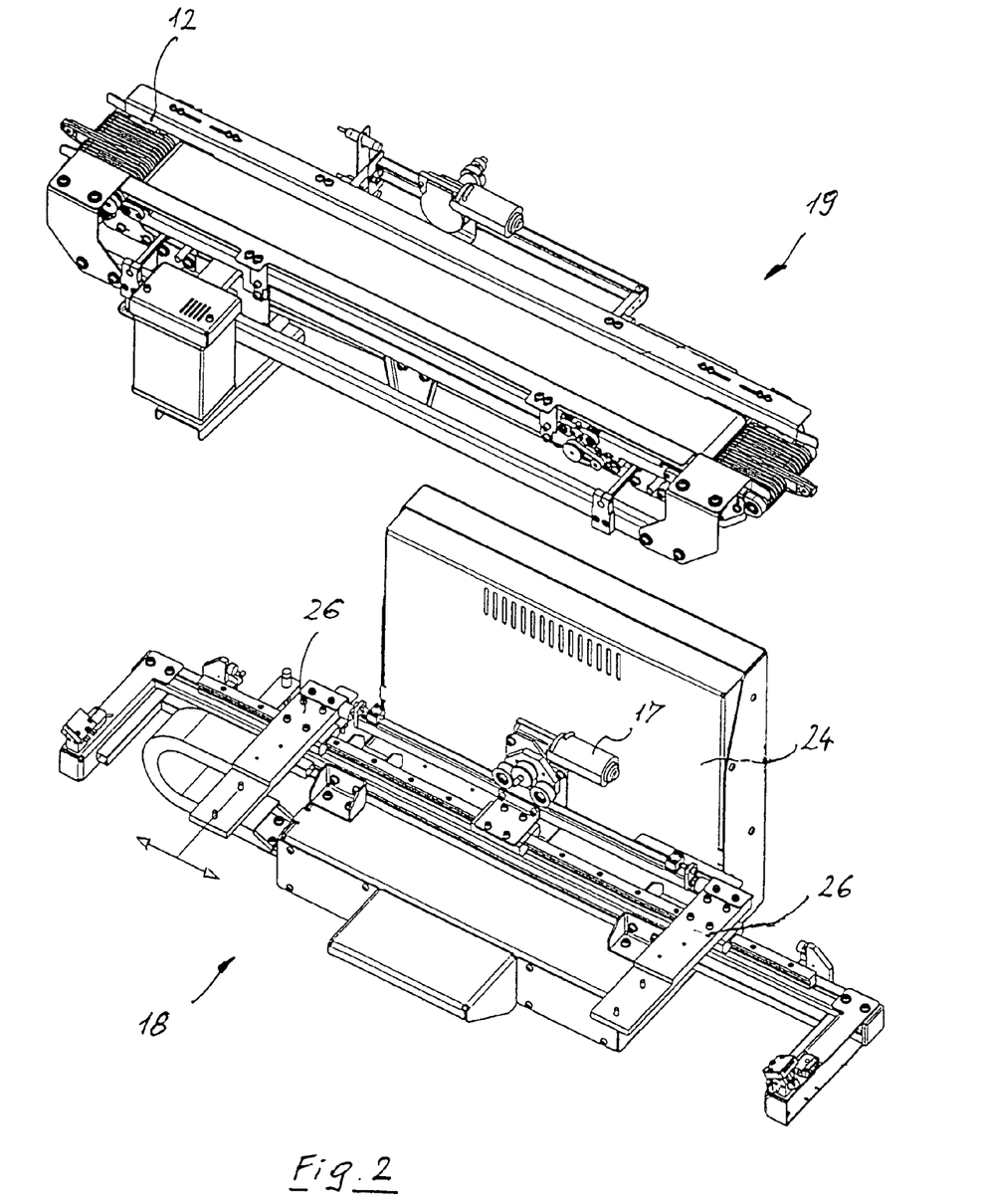
FIG. 2 is an exploded view of the storage and retrieval unit according to FIG. 1, comprising a product handling unit and a base unit.

The storage and retrieval unit 1 according to FIG. 1 is composed of a product handling unit 19 and a base unit 18 according to FIG. 2.

The base unit 18 comprises, among other things, a back frame 24, a continuous belt drive 17 as well as bases 26, which are located at spaced locations from one another and on which the product handling unit 19 according to the top part of FIG. 2 can be fastened in a positioned manner.

Figure 3:
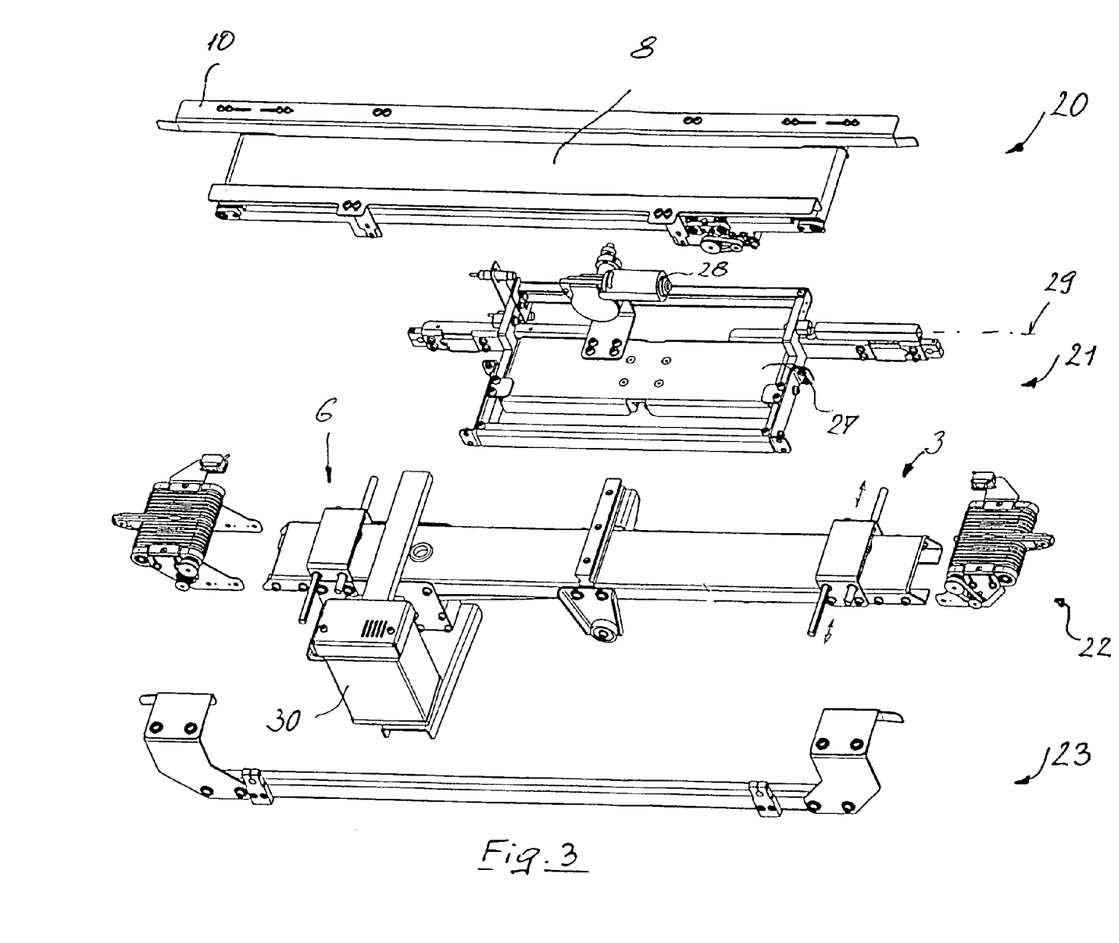
FIG. 3 is an exploded view of the product handling unit according to FIG. 2, comprising a continuous belt unit, a tilting unit, a carrier unit as well as a connection unit.

The product handling unit 19 comprises, in turn, as this is shown in FIG. 3, a continuous belt unit 20, a tilting unit 21, a carrier unit 22, as well as a connection unit 23.

The continuous belt unit 20 has essentially a continuous belt 8, which is led over end-side deflecting rollers and can be driven by the continuous belt drive 17 in both directions, and a longitudinal stop 10, which not only extends over the entire length of the continuous belt 8 on the transverse side of the continuous belt shown in FIG. 3, but also projects on both longitudinal ends of the continuous belt 8, and the frontmost vertical ends are bent.

The longitudinal stop 10 may be a vertical flat guide plate 12 or an angle plate.

The continuous belt unit 20 is fastened on a carriage plate 27 of the tilting unit 21.

The tilting unit 21 contains, furthermore, a pivoting drive 28 and a pivot axis 29, as is shown especially in FIG. 3. The tilting unit 21 is in turn connected via the carriage plate 27 with the carrier unit 22 by means of a guide, at the longitudinal ends of which the two operating fingers 7 of the storage and retrieval unit, which said operating fingers are connected to one another via the connection unit 23, are fastened.

A centering device 3 with a lateral product centering element 9 each in the form of a centering plate and with a centering drive 30 is located in the area of the mounted operating fingers 7 at each longitudinal end, wherein the centering plates are rigidly connected to one another. The centering plate usually has, at least on the inlet side, a conical expansion in the form of an obliquely extending, vertical guide plate, which makes possible the satisfactory entry of a product.

Furthermore, the storage and retrieval unit 1 has a counting device 16 in the form of a counting photocell in the area of each centering device 3 as well as at least one reference photocell 15 in the area of each longitudinal end of the continuous belt 8.

The reference photocells 15 and the counting devices 16 are connected with the central control unit, which synchronously controls all the above-mentioned drives as well as the operating fingers 7.

The mode of operation of the storage and retrieval unit 1 will be described below on the basis of FIGS. 4A through 12B.

According to FIGS. 4A and 4B, the storage and retrieval unit 1 according to FIGS. 1 through 3 is positioned in a removal position of an oblique shelf oaf left-hand product storage shelving 2. The left-hand operating finger 7 extends under the shelf stop of the selected shelf The shelf stop is located at the left-hand operating finger 7. The selected product 4 to be commissioned is lifted over the shelf stop and is fed over a driven extension section to the continuous belt 8 of the storage and retrieval unit 1, which said continuous belt is in the horizontal starting position A. The selected product 4 is then counted by means of the counting device 16 and at the same time centered by the centering device 3. The centering plate of the centering device is first set to the selected product 4 corresponding to the width of the product. The center plate of the centering device is actuated by centering drive 30. The product is moved onto the driven continuous belt and then arranged at the lateral longitudinal stop or laterally centered by the guide plate or centering plate. The product is moved by the forward movement of the driven extension section and by the continuous belt being driven synchronously.

Figures 5A, 5B:
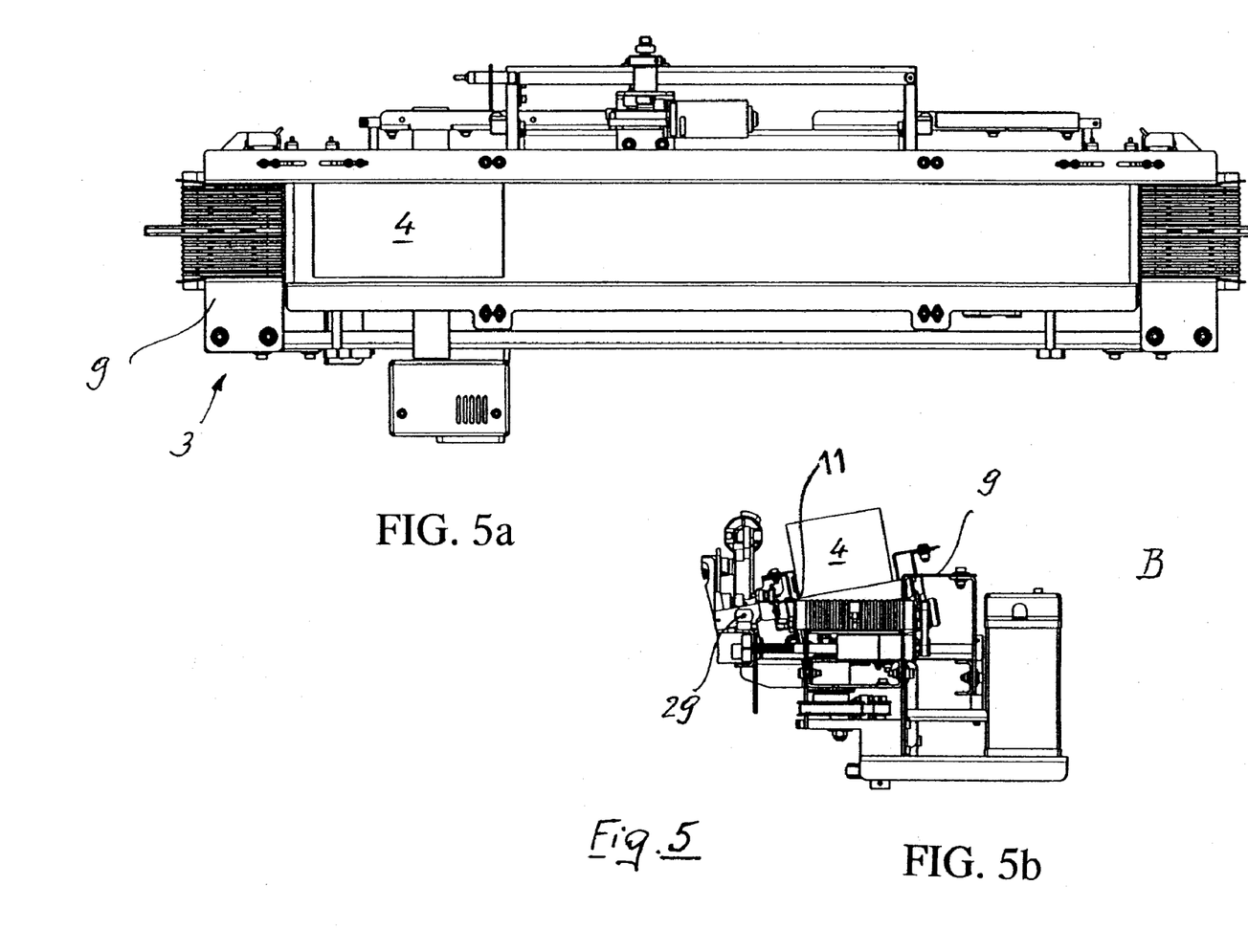
FIG. 5A is a top view of the product handling unit according to FIG. 3 in another handling position of the storage and retrieval unit.
FIG. 5B is a front view of the product handling unit according to FIG. 3 in another handling position of the storage and retrieval unit.

The selected product 4 is registered by the reference photocells 15 according to FIG. 4A and, as was mentioned above, the continuous belt 8 is put into operation by the continuous belt drive 17, so that the product 4 is delivered into the position on the continuous belt 8 shown in FIGS. 5A and 5B, and the continuous belt 18 is then stopped.

The continuous belt 8 including the longitudinal stop 10 are subsequently tilted by means of the tilting unit 21 by actuating the pivoting drive 28 from the horizontal starting position A shown in FIG. 4B into a tilted oblique position B according to FIG. 5B in such a way that the root 11 of the angle between the longitudinal stop 10 and the continuous belt 8 is located at the lowest point, which is a point adjacent to the continuous belt and the longitudinal stop when the continuous belt and the longitudinal stop are in the pivoted position. Thus, not only is the selected product 4 centered on the continuous belt 8, but also held in the root of the angle in a stable manner.

Figure 6A:
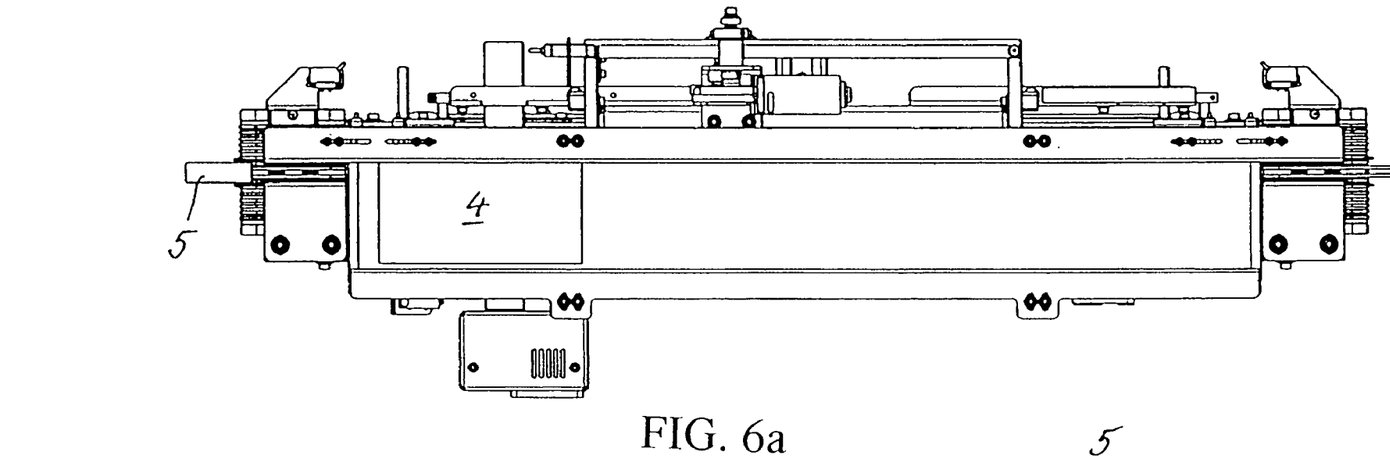
FIG. 6A is a top view of the product handling unit according to FIG. 3 in another handling position of the storage and retrieval unit.
Figure 6B:
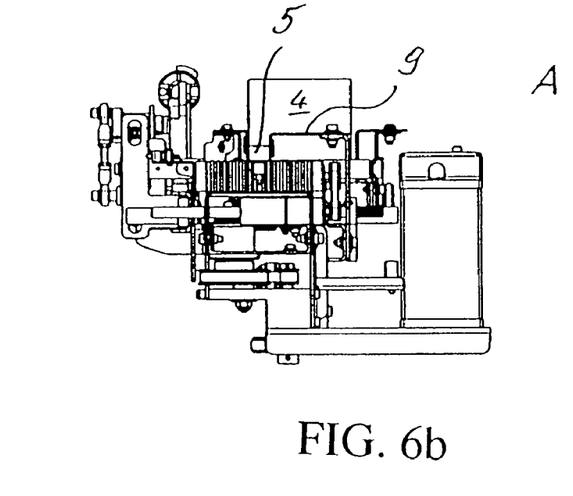
FIG. 6B is a front view of the product handling unit according to FIG. 3 in another handling position of the storage and retrieval unit.
Figures 7A, 7B:
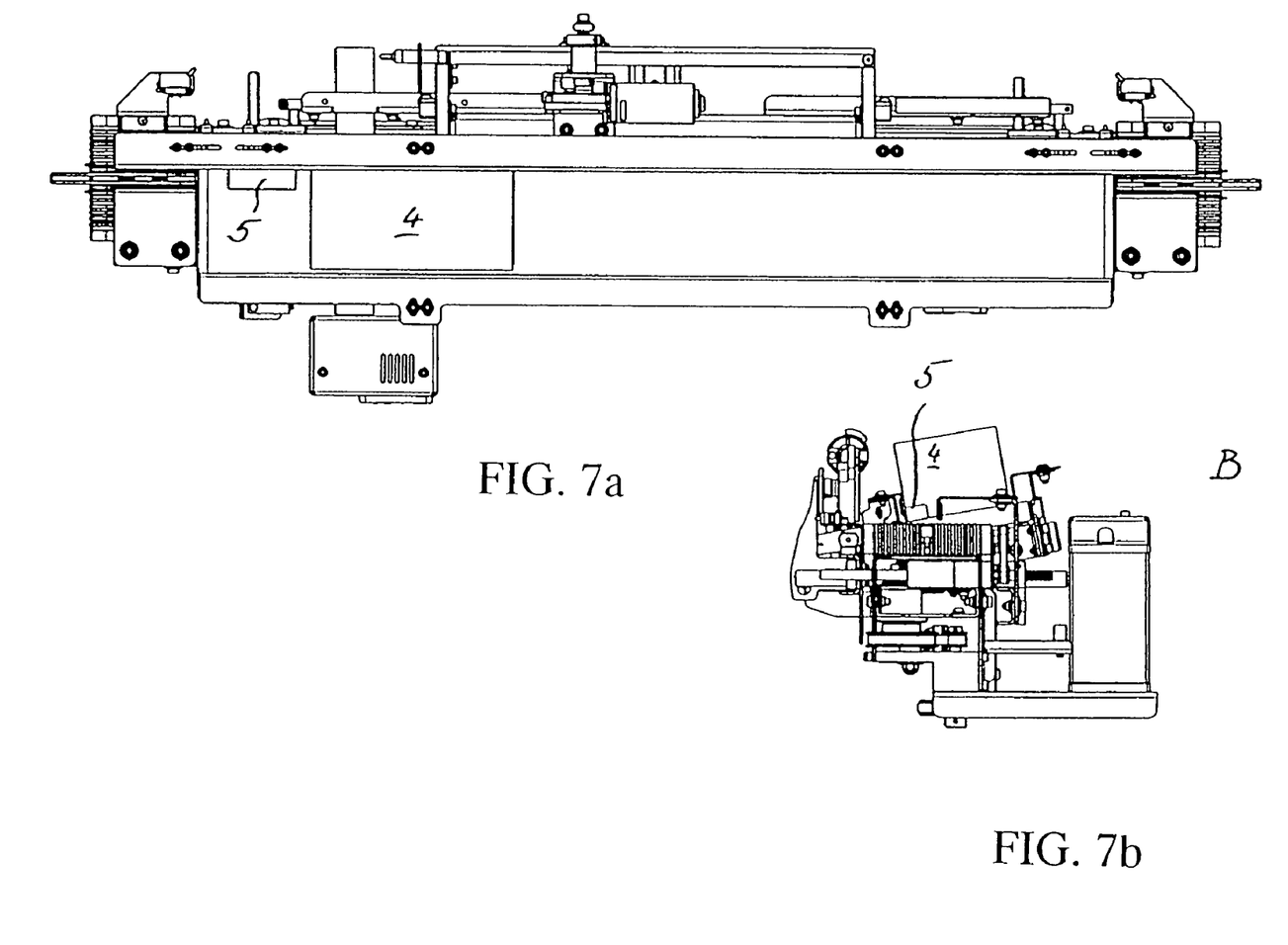
FIG. 7A is a top view of the product handling unit according to FIG. 3 in another handling position of the storage and retrieval unit.
FIG. 7B is a front view of the product handling unit according to FIG. 3 in another handling position of the storage and retrieval unit.

In the pivoted position B of the continuous belt 8 as shown in FIG. 5B, the storage and retrieval unit 1 is subsequently brought in the automatic aisle between the two product storage shelvings 1 in the transverse direction Q of the continuous belt 8 into another removal position of a differently configured cubic product 5 of the product storage shelving 2, left, and is again tilted back there into the horizontal starting position A according to FIG. 6B. The differently configured cubic product 5 is then laterally centered in the same manner as the product 4 and moved onto the continuous belt 8 and is positioned especially at a closely spaced location from product 4. Both products 4 and 5 are then again brought into the pivoted position B according to the FIG. 7B in order to position the storage and retrieval unit 1 at a comparatively high lateral acceleration at another product storage shelving 2 according to the FIG. 8B.

Before the introduction of the additional product 6 according to FIGS. 8A and 8B, the horizontal starting position A according to FIG. 8B is again set, and the latter product 6 is subsequently arranged on the continuous belt 8 according to FIG. 9B, laterally centered and at a closely spaced location from the first product 4. It is obvious that the products 4 and 5 were transferred before to the right on the continuous belt 8 from the position shown in FIGS. 7A and 7B into the position shown in FIGS. 8A and 8B.

Figures 9A, 9B:
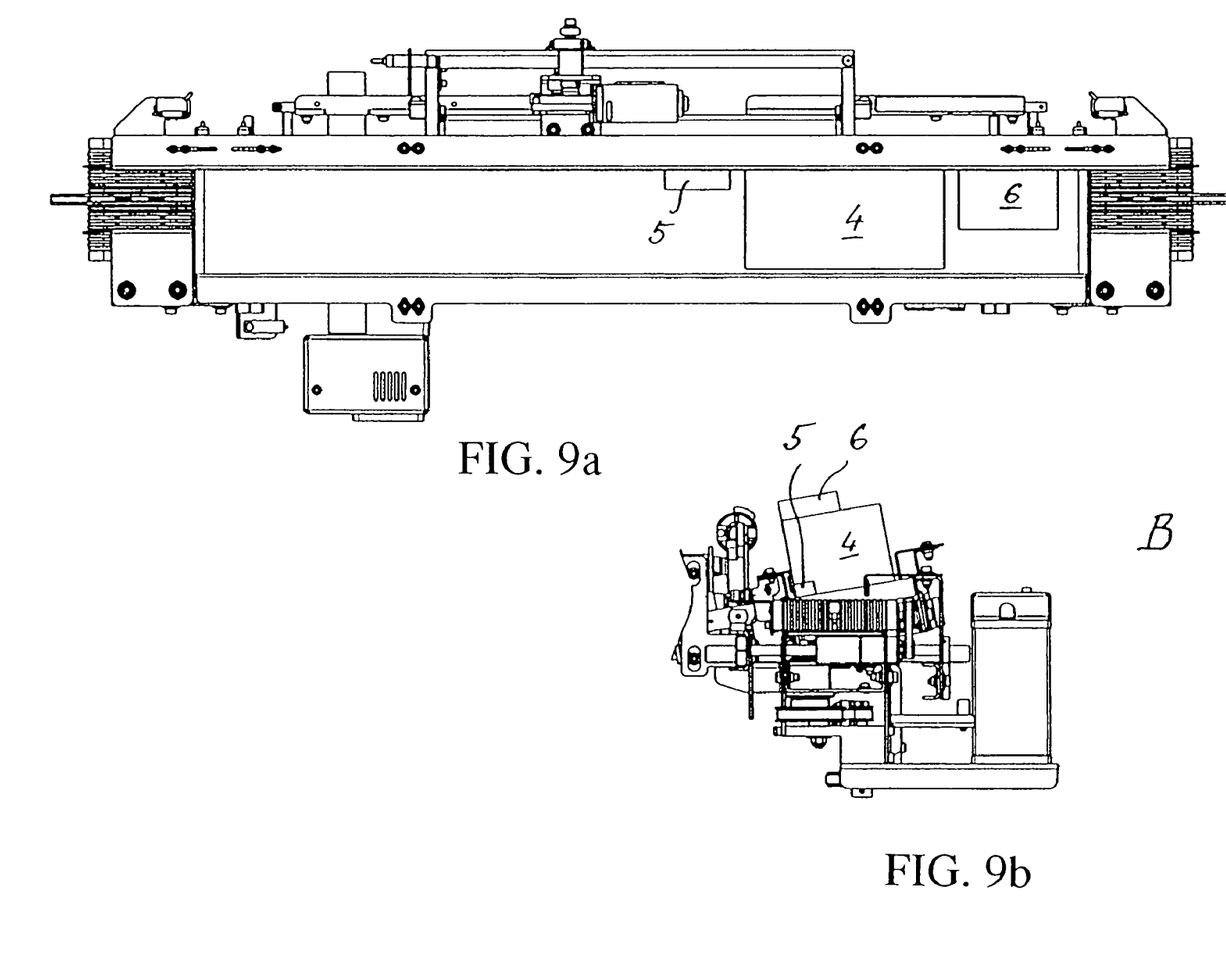
FIG. 9A is a top view of the product handling unit according to FIG. 3 in another handling position of the storage and retrieval unit.
FIG. 9B is a front view of the product handling unit according to FIG. 3 in another handling position of the storage and retrieval unit.
Figure 10A:
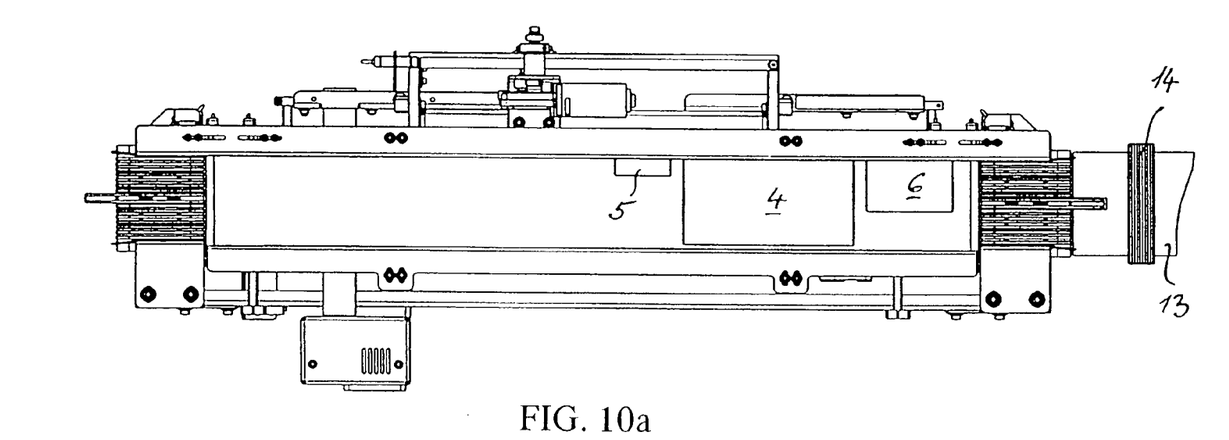
FIG. 10A is a top view of the product handling unit according to FIG. 3 in another handling position of the storage and retrieval unit.
Figure 10B:
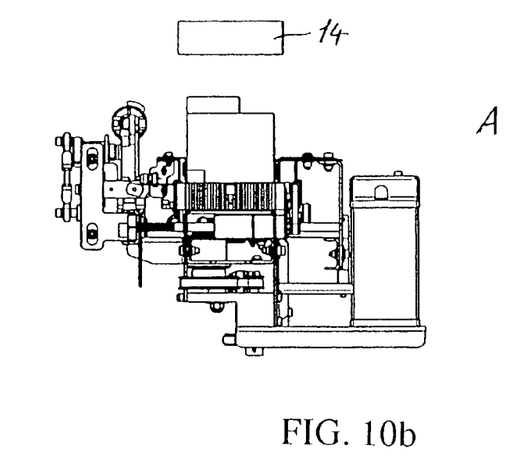
FIG. 10B is a front view of the product handling unit according to FIG. 3 in another handling position of the storage and retrieval unit.

All three products 4, 5 and 6 are then again centered in the pivoted position according to FIG. 9B and optionally sent to additional removal sites of the product storage shelvings 2.

The process is repeated until the continuous belt 8 is completely filled or the commissioning order has been completed.

Figures 11A, 11B:
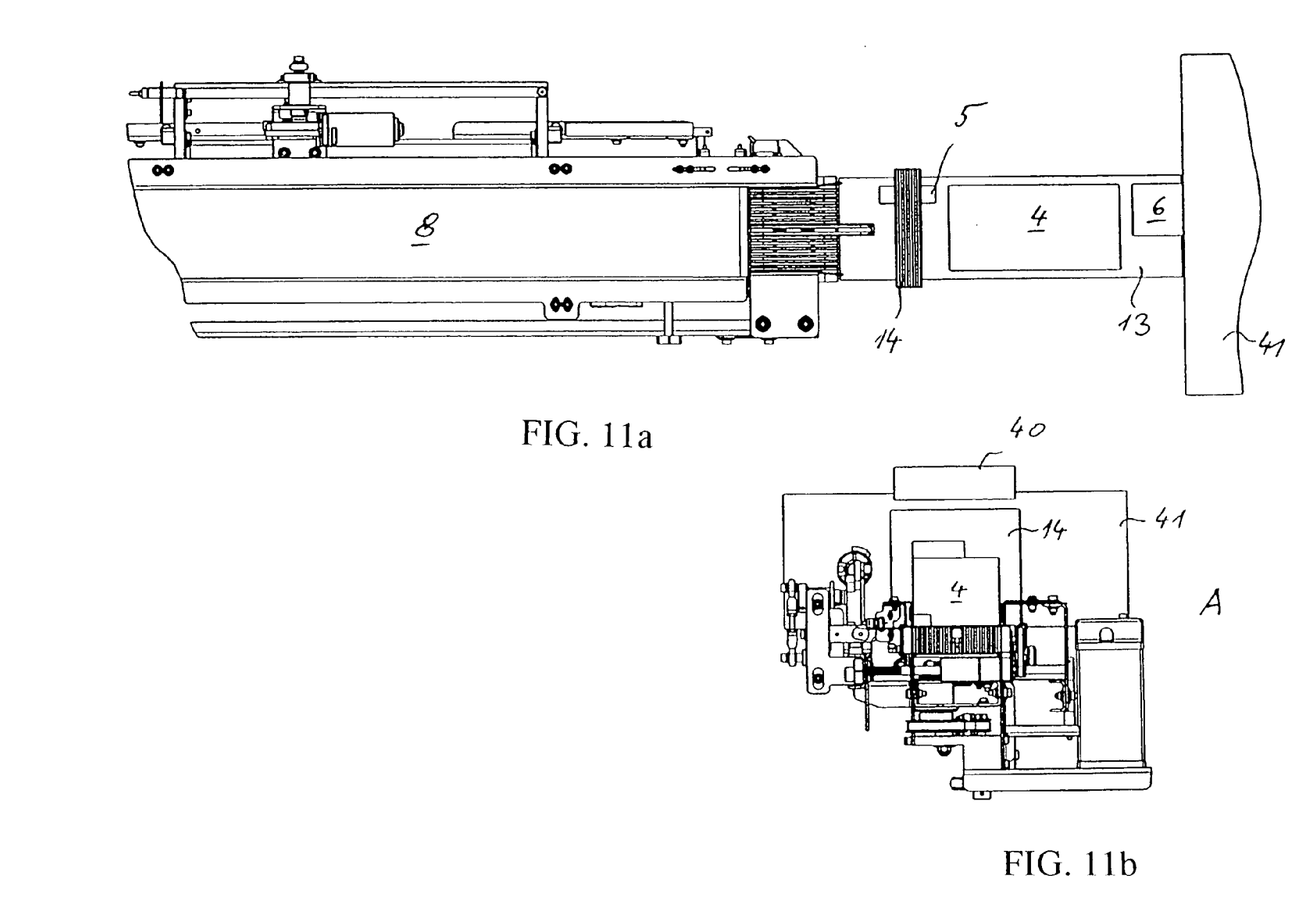
FIG. 11A is a top view of the product handling unit according to FIG. 3 in another handling position of the storage and retrieval unit.
FIG. 11B is a front view of the product handling unit according to FIG. 3 in another handling position of the storage and retrieval unit.
Figures 12A, 12B:
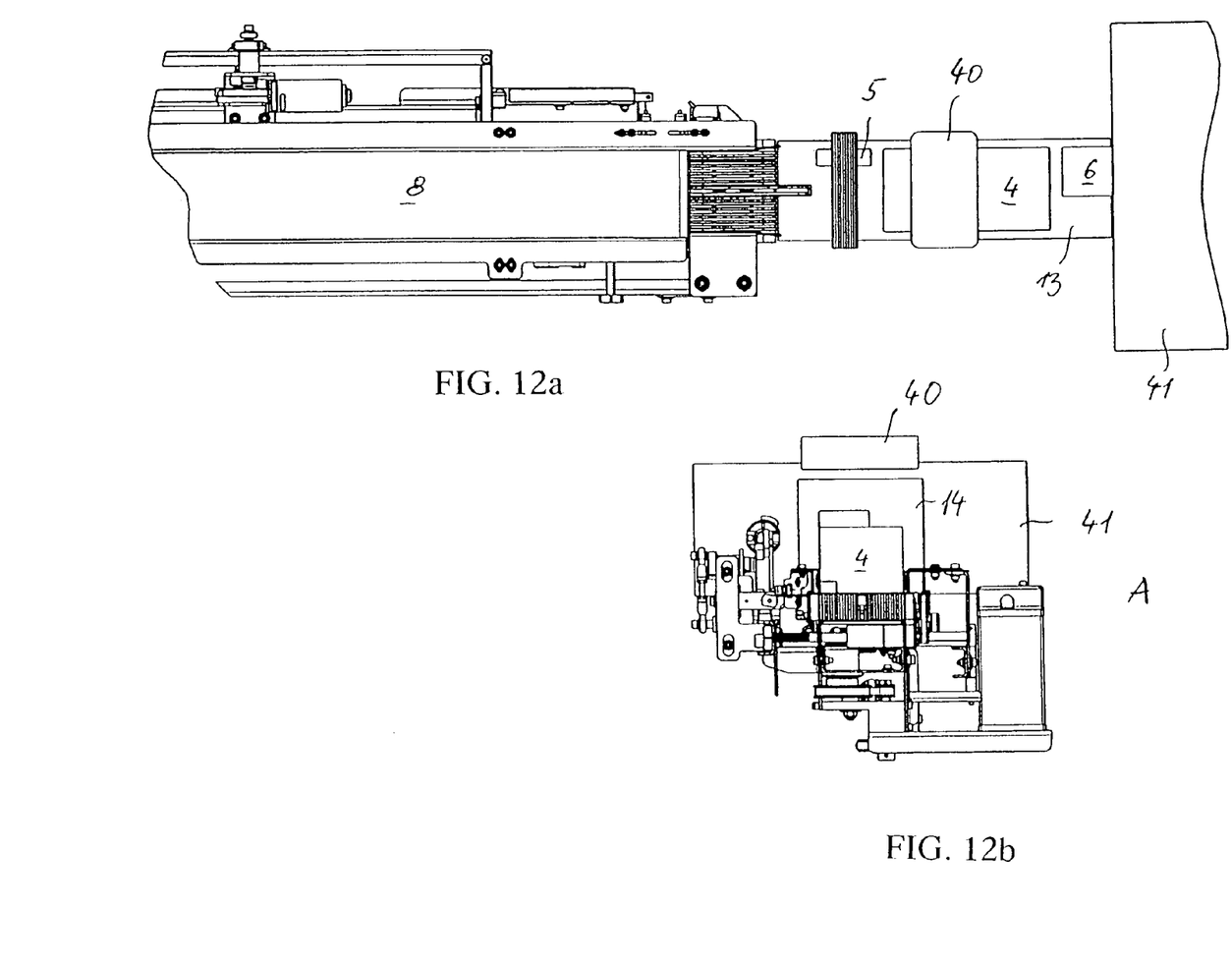
FIG. 12A is a top view of the product handling unit according to FIG. 3 in another handling position of the storage and retrieval unit.
FIG. 12B is a front view of the product handling unit according to FIG. 3 in another handling position of the storage and retrieval unit.

The products 4, 5 and 6 are finally delivered from the pivoted position B onto the joining conveyor belt 13 in the horizontal starting position A according to FIGS. 11A and 11B and 12A and 12B by the continuous belt 8 in an exactly positioned manner, preferably at closely spaced locations from one another, and each product 4, 5 and 6 is identified by a product recognition means 14 in the form of a scanner, which is located above the inlet area of the joining conveyor belt 13, and detected by an image processing means 40 according to FIGS. 12A and 12B, with which visual detection of the actual state of the product and optionally tracing in relation to the product is made possible. The visual detection may also be used for documentation and traceability with respect to the shipped or packaged products.

The products are subsequently sent to a packaging station 41, in which the commissioned products are packaged and are hauled off from there.

While the image processing means 40 is located according to FIGS. 12A and 12B in the area of the joining conveyor belt 13 after the product recognition means 14 above the joining conveyor belt 13 at such a spaced location that comparatively tall cubic products can also be removed without touching, the image processing means 40 is located in a correspondingly high area in the packaging station 41 according to FIGS. 11A and 11B.

As can be seen, differently configured products are handled by the present invention rapidly and reliably with the storage and retrieval unit 1 without the possibility of tilting over laterally. If the products 4, 5 and 6 have, e.g., identification features in the form of bar codes on their top side, these are satisfactorily detected by the scanner according to FIGS. 11A and 11B, because the products cannot tilt over.

It is apparent that the products may also be removed differently from the continuous belt 8, e.g., in a collecting container.

While a specific embodiment of the invention has been shown and described in detail to illustrate the application of the principles of the invention, it will be understood that the invention may be embodied otherwise without departing from such principles.

The invention claimed is:

1. A storage and retrieval unit for operating product storage shelving, which has at least one shelf, on which products are arranged and held and from which products can be removed, the storage unit comprising:

a vertically-adjustable storage and retrieval unit comprising a driven, horizontal continuous belt for transporting products removed from the shelf, said vertically-adjustable storage and retrieval unit being movable along the product storage shelving; and a centering device for aligning the removed products, said centering device including a lateral product centering element arranged on a side of said continuous belt such that said lateral product centering element is adjacent said continuous belt, said lateral product centering element extending perpendicular along said continuous belt, said lateral product centering element being arranged on at least one longitudinal end of said continuous belt, said lateral product centering element being movable in a direction perpendicular to said continuous belt to laterally align a product removed from said product storage shelving against a lateral longitudinal stop of said continuous belt, said longitudinal stop being fixed to said storage and retrieval unit and extending on a transverse side of said continuous belt, said transverse side being located opposite said lateral product centering element.

2. A storage and retrieval unit in accordance with claim 1, wherein said longitudinal stop forms a right angle with said continuous belt.

3. A storage and retrieval unit in accordance with claim 2, wherein said continuous belt including said longitudinal stop is tilted in the transverse direction of said continuous belt into a pivoted position such that root of the angle between said longitudinal stop and said continuous belt is located at a lowest point, said lowest point being a point adjacent said continuous belt and said longitudinal stop when said continuous belt and said longitudinal stop are in the pivoted position.

4. A storage and retrieval unit in accordance with claim 1, wherein said continuous belt including said longitudinal stop is tilted in the transverse direction of said continuous belt into a pivoted position such that root of the angle between said longitudinal stop and said continuous belt is located at a lowest point, said lowest point being a point adjacent said continuous belt and said longitudinal stop when said continuous belt and said longitudinal stop are in the pivoted position.

5. A storage and retrieval unit in accordance with claim 1, wherein said longitudinal stop is a flat guide plate or an angle plate.

6. A storage and retrieval unit in accordance with claim 1, further comprising a stationary product recognition means including a scanner, said scanner identifying the products moving on the continuous belt or on a joining conveyor belt and scans bar codes on a top side of said products, said scanner being associated with said continuous belt or said scanner being located downstream of and joining the conveyor belt on a top side thereof.

7. A storage and retrieval unit in accordance with claim 1, further comprising an image processing means, by which the products moving on said continuous belt or on a joining conveyor belt are visually detected and documented, is associated with said continuous belt or the top side of a downstream joining conveyor belt.

8. A storage and retrieval unit in accordance with claim 1, further comprising a packaging station arranged downstream of said continuous belt or a downstream joining conveyor belt.

9. A storage and retrieval unit in accordance with claim 1, further comprising at least one reference photocell, for controlling said continuous belt, provided in the area of each said longitudinal end of said continuous belt.

10. A storage and retrieval unit in accordance with claim 1, further comprising a continuous belt drive, wherein said continuous belt can be driven by said continuous belt drive in both directions.

11. A method for removing products from a product storage shelving by means of a storage and retrieval unit, the method comprising the steps of:
providing a vertically-adjustable storage and retrieval unit with a driven, horizontal continuous belt, the products being removed from the shelf and fed to the continuous belt;
moving the vertically-adjustable storage and retrieval unit along the product storage shelving;
providing a centering device and using said centering device for centering the removed products, said centering device including a lateral product centering element arranged on one transverse side of the continuous belt, said lateral product centering element being arranged on at least one longitudinal end of the continuous belt such that said lateral product centering element is directly adjacent said continuous belt, said lateral product centering element being perpendicular to said continuous belt, said lateral product centering element being movable in a direction perpendicular to said continuous belt to center a product removed from the product storage shelving in the course of its forward movement against a lateral longitudinal stop of the continuous belt, said longitudinal stop being fixed to said storage and retrieval unit, said longitudinal stop extending on another transverse side of the continuous belt, said another transverse side being located opposite the lateral product centering element;
providing the product storage shelving with at least one oblique shelf, on which products are arranged one after another and are held against a shelf stop at a lowest point of said oblique shelf;
providing an operating finger of the vertically-adjustable storage and retrieval unit, said storage and retrieval unit being movable along said product storage shelving, said operating finger extending under a lowermost product of the products arranged one after another at the shelf stop;
guiding the continuous belt via end-side deflecting rollers;
setting said lateral product centering element to the product width in the transverse direction of said continuous belt;
laterally centering a product removed from said product storage shelving by passing the product from said operating finger through said lateral product centering element to said driven continuous belt, said continuous belt including an extension belt section arranged upstream of said lateral product centering element.

12. A method in accordance with claim 11, further comprising removing the products from the product storage shelving by means of the operating finger and counting by a counting device with a counting photocell.

13. A method in accordance with claim 12, further comprising controlling the continuous belt at each of two continuous belt longitudinal ends by a reference photocell.

14. A method in accordance with claim 11, further comprising controlling the continuous belt at each of two continuous belt longitudinal ends by a reference photocell.

15. A method in accordance with claim 11, further comprising delivering the products removed from the product storage shelving onto the continuous belt at closely spaced locations.

16. A method in accordance with claim 11, further comprising tilting the continuous belt in the transverse direction into a pivoted position after the delivery of at least one product onto the continuous belt.

17. A method in accordance with claim 16, further comprising transferring or pushing the tilted continuous belt along the product storage shelving in the transverse direction.

18. A method in accordance with claim 17, further comprising tilting back the tilted continuous belt, transferred or pushed along the product storage shelving, into a horizontal starting position for picking up another product or for releasing products already picked up.

19. A method in accordance with claim 11, further comprising releasing the products located on the continuous belt to an aligned joining conveyor belt.

20. A method in accordance with claim 19, further comprising identifying the products released onto the joining conveyor belt by a product recognition means including a scanner.

21. A method in accordance with claim 19, further comprising visually detecting and documenting the products released onto the joining conveyor belt by an image processing means.

22. A method for removing products from a product storage shelving by means of a storage and retrieval unit, the method comprising the steps of:
providing a vertically-adjustable storage and retrieval unit with a driven, horizontal continuous belt;
feeding products to the continuous belt;
moving the vertically-adjustable storage and retrieval unit along the product storage shelving;
providing a centering device and using said centering device for centering the removed products, said centering device including a lateral product centering element arranged on one transverse side of the continuous belt, said lateral product centering element being arranged on at least one longitudinal end of the continuous belt, said lateral product centering element being movable in a direction perpendicular to said continuous belt to center a product removed from the product storage shelving in the course of its forward movement against a lateral longitudinal stop of the continuous belt, said longitudinal stop being fixed to said storage and retrieval unit, said longitudinal stop extending along another transverse side of the continuous belt, said longitudinal stop being perpendicular to said continuous belt, said another transverse side being located opposite the lateral product centering element;
providing the product storage shelving with at least one oblique shelf, on which products are arranged one after another and are held against a shelf stop at a lowest point of said oblique shelf;
providing an operating finger of the vertically-adjustable storage and retrieval unit, said storage and retrieval unit being movable along said product storage shelving, said operating finger extending under a lowermost product of the products arranged one after another at the shelf stop;
guiding the continuous belt via end-side deflecting rollers;
setting said lateral product centering element to the product width in the transverse direction of said continuous belt;
laterally centering a product removed from said product storage shelving by passing the product from said operating finger through said lateral product centering element to said driven continuous belt, said continuous belt including an extension belt section arranged upstream of said lateral product centering element; and
tilting said longitudinal stop and said continuous belt from a horizontal position to a tilted position such that a portion of said product is located at a point adjacent said continuous belt and said longitudinal stop when said continuous belt and said longitudinal stop are in said tilted position; and
moving said product in said tilted position via said continuous belt.

23. A method in accordance with claim 22, wherein said lateral product centering element is located perpendicular to said continuous belt.

24. A method in accordance with claim 22, wherein said lateral product centering element is located directly adjacent said continuous belt.

* * * * *